US008445090B2

(12) United States Patent
Nakajima et al.

(10) Patent No.: US 8,445,090 B2
(45) Date of Patent: May 21, 2013

(54) FIXING BELT

(75) Inventors: Shingo Nakajima, Osaka (JP); Jun Sugawara, Osaka (JP); Hiromi Kamimura, Sennan-gun (JP); Masatoshi Ishikawa, Sennan-gun (JP)

(73) Assignees: Sumitomo Electric Industries, Ltd., Osaka-shi, Osaka (JP); Sumitomo Electric Fine Polymer, Inc., Osaka (JP)

( * ) Notice: Subject to any disclaimer, the term of this patent is extended or adjusted under 35 U.S.C. 154(b) by 0 days.

(21) Appl. No.: 13/394,633

(22) PCT Filed: Jan. 12, 2011

(86) PCT No.: PCT/JP2011/050303

§ 371 (c)(1), (2), (4) Date: Mar. 7, 2012

(87) PCT Pub. No.: WO2011/111411

PCT Pub. Date: Sep. 15, 2011

(65) Prior Publication Data

US 2012/0170958 A1 Jul. 5, 2012

(30) Foreign Application Priority Data

Mar. 8, 2010 (JP) ................................ 2010-050425

(51) Int. Cl.

*B32B 15/06* (2006.01)
*B32B 25/02* (2006.01)
*B32B 25/08* (2006.01)
*B32B 25/14* (2006.01)
*B32B 25/20* (2006.01)

(52) U.S. Cl.

USPC ........ 428/36.91; 428/421; 428/447; 428/457; 428/473.5; 399/333; 977/742; 977/753

(58) Field of Classification Search

None

See application file for complete search history.

(56) References Cited

U.S. PATENT DOCUMENTS

2010/0055450 A1* 3/2010 Qi et al. ........................ 428/336

FOREIGN PATENT DOCUMENTS

| | | |
|---|---|---|
| JP | 2005-189322 | 7/2005 |
| JP | 3712086 | 8/2005 |
| JP | 3735991 | 11/2005 |
| JP | 2007-101735 | 4/2007 |
| JP | 2007-121441 | 5/2007 |
| JP | 2007-179009 | 7/2007 |
| JP | 2007-332281 | 12/2007 |
| JP | 2007-334376 | 12/2007 |
| JP | 2008-180966 | 8/2008 |
| JP | 2009-180785 | 8/2009 |
| JP | 2010-176130 | 8/2010 |
| JP | 2011-13363 | 1/2011 |

* cited by examiner

*Primary Examiner* — Ramsey Zacharia

(74) *Attorney, Agent, or Firm* — Drinker Biddle & Reath LLP

(57) ABSTRACT

Provided is a fixing belt which has high thermal conductivity capable of achieving an excellent fixing property that can respond to the recent increase in printing speed, which has a proper degree of elasticity such that color toners are sufficiently enveloped so as to be melted and mixed, and which has excellent mechanical strength and durability. A fixing belt includes a tubular base member, an elastic layer disposed on the outer circumferential side of the base member, and a surface layer disposed on a surface on the outer circumferential side of the elastic layer, the fixing belt being characterized in that the elastic layer is composed of rubber into which a filler primarily composed of silicon carbide powder and a carbon nanotube are compounded, and the formulae $10X+3Y<750$, $3X+30Y>170$, $X>10$, and $Y>0.1$ are satisfied, where X is the percent by volume of the filler and Y is the percent by volume of the carbon nanotube in the elastic layer.

8 Claims, 1 Drawing Sheet

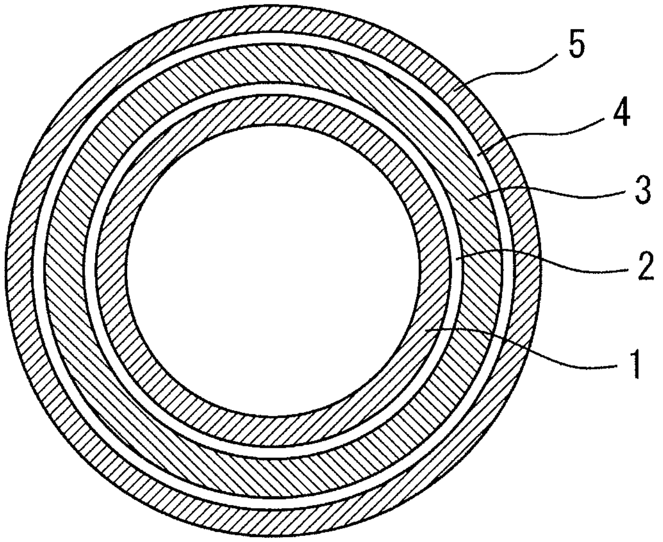
5
4
3
2
1

FIXING BELT

TECHNICAL FIELD

The present invention relates to a fixing belt used for thermally fixing a toner image transferred onto a transfer-receiving body, such as recording paper, in an image forming apparatus, such as an electrophotographic copying machine, a facsimile machine, or a laser beam printer. More particularly, the invention relates to a fixing belt used for thermally fixing a toner image in an image forming apparatus using a plurality of kinds of color toners.

BACKGROUND ART

In image forming apparatuses, such as electrophotographic copying machines, facsimile machines, and laser beam printers, a thermal fixing method has been generally employed in which, in the final stage of printing/copying, a fixing belt (i.e., a fixing sleeve, fixing tube roller, or the like) provided with a heating source inside and a pressure roller are pressed into contact with each other, and a transfer-receiving body onto which a toner image has been transferred is passed therebetween, whereby unfixed toner is melted by heating.

As the fixing belt, there has been generally used a fixing belt having a structure in which a resin layer having excellent elasticity, releasability, wear resistance, and the like is disposed on a surface (surface to be in contact with a transfer-receiving body) of a tubular base member composed of a high-strength, heat-resistant resin, such as polyimide, or a fixing roller including a cylindrical base member composed of metal or polyimide and a resin layer having excellent elasticity, releasability, wear resistance, and the like disposed on the outer circumferential side of the base member. As the resin layer having excellent elasticity, releasability, wear resistance, and the like, a fluororesin coating layer has been widely used.

In order to obtain a good fixing property, it is necessary that a transfer-receiving body be sufficiently heated by a heating source provided inside a fixing belt. Consequently, the fixing belt is required to have excellent thermal conductivity.

Furthermore, in the fixing process of an image forming apparatus using a plurality of kinds of color toners, it is necessary to mix a plurality of kinds of color toners in a molten state when fixing is performed. Consequently, a fixing belt used for this purpose is required to have a proper degree of elasticity such that color toners are sufficiently enveloped so as to be melted and mixed.

As described above, since the fixing belt is required to have excellent thermal conductivity and a proper degree of elasticity, in order to satisfy these requirements, PTL 1 proposes a fixing belt including a heat-resistant elastomer layer (elastic layer) provided on the outer circumferential side of a tubular base member, and a fluororesin layer provided further thereon, in which the thickness of each of the tubular base member, the fluororesin layer, and the heat-resistant elastomer layer is specified, and the relationships between thickness, hardness, and thermal conductivity of the heat-resistant elastomer layer are defined so as to be within specific ranges (Claim 2). In order to satisfy these conditions, a technique is proposed in which an inorganic filler that improves thermal conductivity, such as silica, alumina, or boron nitride, is compounded into the heat-resistant elastomer (paragraph 0015).

Furthermore, PTL 2 discloses a fixing belt having a laminated structure in which a heat-resistant elastomer layer is disposed on the surface of a metal tube or heat-resistant plastic tube, and a silicone rubber or fluororesin layer is further disposed on the outer surface thereof, in which the deformation under load and the thickness of each of the layers are within predetermined ranges, and furthermore, the hardness and thermal conductivity of the heat-resistant elastomer layer are within predetermined ranges (Claim 1).

A method is also proposed in which, in order to set the thermal conductivity of the heat-resistant elastomer layer within the predetermined range, an inorganic filler that improves thermal conductivity, such as silica, alumina, or boron nitride, is compounded thereinto, and it is disclosed that by this method, heat from a heating source can be quickly supplied to the outer surface of the fixing belt (paragraph 0012).

CITATION LIST

Patent Literature

PTL 1: Japanese Patent No. 3735991
PTL 2: Japanese Patent No. 3712086

SUMMARY OF INVENTION

Technical Problem

However, in recent years, with the increase in printing speed, fixing belts have been required to have higher thermal conductivity. Accordingly, in order to achieve a fixing property that meets the user's strict requirements in recent years, an improvement in thermal conductivity has been desired because the thermal conductivity such as the one described in the cited art has been becoming insufficient.

In order to obtain higher thermal conductivity, a method is conceivable in which the amount of a filler (inorganic filler or the like) that improves thermal conductivity to be compounded is increased. However, in the fixing belt described in PTL 1 or 2, if the amount of the inorganic filler, such as silica, alumina, or boron nitride, is increased, elasticity of the fixing belt decreases, and it becomes difficult to obtain a proper degree of elasticity such that color toners are sufficiently enveloped so as to be melted and mixed.

It is an object of the present invention to provide a fixing belt which has high thermal conductivity capable of responding to the recent increase in printing speed, which has a proper degree of elasticity such that color toners are sufficiently enveloped so as to be melted and mixed, and which has excellent mechanical strength and durability.

Solution to Problem

As a result of diligent research, the present inventors have found that in a fixing belt including a tubular base member, a surface layer, and an elastic layer disposed between the base member and the surface layer, by using as a material for the elastic layer rubber into which a filler primarily composed of silicon carbide powder and a carbon nanotube are compounded, and by setting the compounding ratio between the filler and the carbon nanotube in the range expressed by predetermined formulae, both high thermal conductivity and a proper degree of elasticity can be achieved, and mechanical strength is not decreased, and thus the present invention has been completed. That is, the problems described above are solved by the invention having the constitution described below.

The invention according to Claim 1 relates to a fixing belt including a tubular base member, an elastic layer disposed on the outer circumferential side of the base member, and a surface layer disposed on a surface on the outer circumferential side of the elastic layer, the fixing belt being characterized in that the elastic layer is composed of rubber into which a filler primarily composed of silicon carbide powder (hereinafter, may be abbreviated as "SiC") and a carbon nanotube (hereinafter, may be abbreviated as "CNT") are compounded, and the formulae $10X+3Y<750$, $3X+30Y>170$, $X>10$, and $Y>0.1$ are satisfied, where X is the percent by volume of the filler and Y is the percent by volume of the CNT in the elastic layer.

As described above, in the fixing belt, in order to achieve excellent thermal conductivity that satisfies the recent requirements, it is necessary to increase the compounding ratio of a filler, such as silica, alumina, or boron nitride, to the elastic layer. In such a case, the elastic layer hardens, and it is not possible to obtain a proper degree of elasticity such that color toners are sufficiently enveloped so as to be melted and mixed. However, when a filler primarily composed of SiC is used together with a CNT and the compounding amounts of these are set within the range expressed by the formulae described above, it is possible to achieve both excellent thermal conductivity that sufficiently satisfies the recent requirements and a proper degree of elasticity, and also higher durability can be obtained.

A CNT is composed of carbon crystals (graphite or the like) and has a short axis diameter (fiber diameter) of submicron size or less. For example, a CNT has a configuration in which a layer of graphite is rolled into a tube. It is known that CNTs are compounded into a resin or the like to improve thermal conductivity. CNTs have a true specific gravity of 2.0 $g/cm^3$ and usually have an aspect ratio of 50 to 1,000. A graphite structure-type CNT having such a high aspect ratio is desirably used.

Typical examples of CNTs include single-wall CNTs and multi-wall CNTs having a concentric internal structure. Examples of CNTs also include carbon nanofibers (CFs) having a fiber diameter of 1 μm or less (submicron size or less) and CNTs in which several bottomless cup-shaped carbon material layers are stacked. In addition, Japanese Unexamined Patent Application Publication No. 2004-123867 discloses a polyimide tube into which a CNT is compounded. However, since the CNT is compounded into a polyimide resin, mechanical strength markedly decreases when the compounding ratio is increased.

The filler used in the present invention is characterized by being primarily composed of SiC. The term "primarily composed of" means both a case where the filler is composed of SiC only and a case where the filler is mostly composed of SiC (preferably in an amount of 80% by volume or more), and another filler is included within a range that does not impair the gist of the present invention. The present inventors have found that when a filler primarily composed of SiC is used, excellent adhesion between the elastic layer and the other layer can be obtained, thus preventing the occurrence of peeling during use of a printer (copying machine), and thermal conductivity is further improved.

SiC is powder of silicon carbide. The mean particle diameter of SiC is preferably 10 μm or less. When the mean particle diameter exceeds 10 μm, there is a possibility that hardness of the elastic layer may become too high or durability may be degraded. Furthermore, as the other filler that can be included within a range that does not impair the gist of the present invention, a substance which is compounded as a filler that improves thermal conductivity in conventional fixing belts can be used. Examples thereof include alumina, silica, boron nitride, graphite, metal silicon, and the like.

The present invention is characterized in that the formula $10X+3Y<750$ is satisfied, where X is the percent by volume of the filler (primarily composed of SiC) and Y is the percent by volume of the CNT in the elastic layer. When $10X+3Y$ is greater than or equal to 750, the elastic layer hardens and it becomes difficult to obtain a proper degree of elasticity such that color toners are sufficiently enveloped so as to be melted and mixed. (The $10X+3Y$ value is highly correlated with hardness of the elastic layer. Therefore, hereinafter, the $10X+3Y$ value may be referred to as a "hardness index"). $10X+3Y$ is preferably less than 650, and more preferably less than 600, which results in a better fixing property.

Note that X and Y mean percentages (%) of absolute volumes of the filler and the CNT, respectively, when the entire volume of the elastic layer is set to be 100%. The absolute volume can be easily calculated from the weight and specific gravity of each of them.

The present invention is also characterized in that $3X+30Y>170$. When $3X+30Y$ is less than or equal to 170, it is not possible to obtain an excellent fixing property. (The $3X+30Y$ value is highly correlated with thermal conductivity of the elastic layer. Therefore, hereinafter, the $3X+30Y$ value may be referred to as a "thermal conduction index"). $3X+30Y$ is preferably greater than or equal to 180, and more preferably greater than or equal to 200, which results in a better fixing property.

The present invention is characterized in that the CNT is contained in the elastic layer so as to satisfy the formula $Y>0.1$. In the case where the CNT is not contained, i.e., in the case where $Y=0$, it is necessary to increase the compounding ratio of the filler, and as a result, a proper degree of elasticity cannot be obtained. By setting the CNT content within a range satisfying the formula $Y>0.1$, the compounding ratio of the filler can be decreased, and as a result, a more proper degree of elasticity can be achieved.

On the other hand, the upper limit of Y is preferably less than or equal to 40, and more preferably less than or equal to 5. When the amount of CNT is too large, the viscosity of an application liquid used for forming the elastic layer becomes too high, which may cause a problem in terms of application properties.

In order to achieve excellent adhesion and thermal conductivity of the elastic layer, it is necessary to set X to be greater than 10.

As a material (matrix) constituting the elastic layer, a heat-resistant elastomer that is used for an intermediate layer for imparting elasticity in conventional fixing belts can be used. The matrix is not necessarily limited to vulcanized rubber, and a material which is not easily degraded by heating when the fixing belt is produced and used and which has elasticity can be used. As the heat-resistant elastomer, silicone rubber or fluororubber is preferably used because of its excellent heat resistance (Claim 2).

As the material for the surface layer, a fluororesin which has excellent toner releasability, durability, and color toner fixing property is preferably used (Claim 3).

Examples of the tubular (tube-shaped) base member include a tubular base member composed of a flexible material and a cylindrical base member. Consequently, examples of the fixing belt (fixing sleeve) of the present invention include a fixing belt having a structure including a tubular base member composed of a flexible material, an elastic layer disposed on the outer circumferential side thereof, and a surface layer disposed on the outer circumferential side of the elastic layer, and a fixing roller having a structure including a cylindrical base member, an elastic layer disposed on the outer circumferential side thereof, and a surface layer disposed on the outer circumferential side of the elastic layer.

As the material for the tubular base member, specifically, a metal tube or heat-resistant plastic tube can be used (Claim 4). As the tubular base member composed of a flexible material, a tube-shaped film (tube) composed of polyimide or polyamide-imide is preferably used because of its excellent heat resistance and mechanical strength (Claim 5). In order to improve the thermal conductivity of the base member, an inorganic filler or the like may be added as long as mechanical strength can be kept. As the cylindrical base member, a metal tube or the like can also be used.

In a fixing belt (fixing sleeve), when adhesion among the individual layers is insufficient, interlayer peeling may occur during use of a printer (copying machine). In the fixing belt (fixing sleeve) of the present invention, by using SiC as a filler contained in the elastic layer, excellent adhesion between the elastic layer and the other layer is exhibited. In order to further improve adhesion among the individual layers, usually, a lower primer layer (i.e., a primer layer provided between the base member and the elastic layer) is provided between the base member and the elastic layer, and an upper primer layer (i.e., a primer layer provided between the elastic layer and the surface layer) is provided between the elastic layer and the surface layer.

Furthermore, in order to improve adhesion among the base member/lower primer layer/elastic layer, the methods 1 and 2 described below may be employed.

Method 1

In this method, silicone rubber is selected as the rubber constituting the elastic layer, and an appropriate amount of an adhesive component is added into silicone rubber. As a result of research, the present inventors have found that by adding a specific adhesive component, silane coupling agent, or rubber-based resin for primer use to the elastic layer in an appropriate amount, i.e., in the range described below, adhesion is improved and durability during paper passing is increased without impairing high thermal conductivity and adequate rubber elasticity.

Claims 6 and 7 each relate to a fixing belt obtained by this method. Claim 6 relates to the fixing belt according to any one of Claims 1 to 5, characterized in that the base member and the elastic layer are bonded to each other with a lower primer layer, the rubber constituting the elastic layer is silicone rubber, and in the elastic layer, a silane coupling agent is compounded in an amount of 0.5% to 5% by weight relative to the silicone rubber. Claim 7 relates to the fixing belt according to any one of Claims 1 to 5, characterized in that the base member and the elastic layer are bonded to each other with a lower primer layer, the rubber constituting the elastic layer is silicone rubber, and in the elastic layer, a rubber-based resin for primer use is compounded in an amount of 0.1% to 3% by weight relative to the silicone rubber.

Here, as the silane coupling agent, an organosilicon compound having in its molecule a reactive group (methoxy group, ethoxy group, silanol group, or the like) that chemically binds to an inorganic substance and a reactive group (vinyl group, epoxy group, methacryl group, amino group, mercapto group, or the like) that chemically binds to an organic material may be used, and examples thereof include vinyltrimethoxysilane, vinyltriethoxysilane, γ-methacryloxypropyltrimethoxysilane, γ-glycidoxypropyltrimethoxysilane, γ-aminopropyltriethoxysilane, and γ-mercaptopropyltrimethoxysilane. Above all, organosilicon compounds having a methoxy group and an epoxy group are preferable, and commercially available such compounds under the trade name KBE-403 (manufactured by Shin-Etsu Chemical Co., Ltd.) and the like can be used.

As the rubber-based resin for primer use, commercially available products can be used. Preferably, the type thereof is selected depending on the base member. For example, in the case where the base member is a metal, preferred examples of the rubber-based resin for primer use include X-33-173 (manufactured by Shin-Etsu Chemical Co., Ltd). In the case where the base member is a resin, such as polyimide, preferred examples of the rubber-based resin for primer use include X-33-174 and X-33-176-1 (manufactured by Shin-Etsu Chemical Co., Ltd).

Method 2

In this method, silicone rubber is selected as the rubber constituting the elastic layer, and silicone rubber is added to the primer layer. Claim 8 relates to a fixing belt obtained by this method and relates to the fixing belt according to any one of Claims 1 to 5, characterized in that the base member and the elastic layer are bonded to each other with a lower primer layer, the rubber constituting the elastic layer is silicone rubber, and the lower primer layer contains silicone rubber.

Although the type of silicone rubber is not particularly limited, rubber having a low content of filler and high adhesion is preferable. The amount of silicone rubber to be added is preferably about 0.1% to 30% by weight relative to the lower primer layer.

The method of producing the fixing belt of the present invention is not particularly limited. For example, a fixing belt can be produced by applying, with a dispenser, a heat-resistant elastomer, such as silicone rubber or fluororubber, onto the outer circumferential side of a tubular base member or cylindrical base member serving as an innermost layer, followed by curing to form an elastic layer, then applying a dispersion liquid of a fluororesin thereonto, and sintering the fluororesin by heat treatment to form a surface layer. Preferably, in order to improve adhesion among the individual layers, a lower primer layer is formed on the outer circumferential surface of the base member before applying the heat-resistant elastomer, and an upper primer layer is formed on the outer circumferential surface of the elastic layer before applying the dispersion liquid of the fluororesin.

Alternatively, an elastic layer may be formed by producing a heat-shrinkable tube composed of a heat-resistant elastomer into which a vulcanizing agent is compounded, and putting the tube on the circumferential side of the base member, followed by heat shrinking.

The fixing belt of the present invention is used in a fixing section of various types of image forming apparatuses. In the fixing section, a heating source is provided inside the fixing belt, the fixing belt is opposed to and pressed into contact with a pressure roller composed of a rubber roller or the like, and a transfer-receiving body onto which a toner image has been transferred is passed therebetween, whereby unfixed toner is melted by heating to be fixed.

Advantageous Effects of Invention

A fixing belt of the present invention has high thermal conductivity capable of achieving an excellent fixing property that can respond to the recent increase in printing speed, and has a proper degree of elasticity such that color toners are sufficiently enveloped so as to be melted and mixed. Furthermore, in the fixing belt, mechanical strength is not degraded, and excellent adhesion between the elastic layer and the other layer is exhibited.

BRIEF DESCRIPTION OF DRAWINGS

FIG. 1 is a cross-sectional view orthogonal to the axis of rotation of an example of a fixing belt according to the present invention.

DESCRIPTION OF EMBODIMENTS

Embodiments of the present invention will be described below. However, it is to be understood that the present invention is not limited to the embodiments, and the present invention can be modified within a range not deviating from the gist of the present invention.

FIG. 1 is a view schematically showing an example of a fixing belt (roller) of the present invention, and is a cross-sectional view orthogonal to the axis of rotation of the fixing belt. In FIG. 1, reference sign 1 denotes a base member, reference sign 3 denotes an elastic layer, and reference sign 5 denotes a surface layer. Furthermore, a primer layer 2 (lower primer layer) and a primer layer 4 (upper primer layer) for improving adhesion are provided between the base member 1 and the elastic layer 3 and between the elastic layer 3 and the surface layer 5, respectively.

In the example of FIG. 1, the base member 1 is an endless belt composed of a polyimide resin. As the base member 1, in addition to this, a cylinder composed of resin or metal, or a columnar solid body (roller) can also be used. Furthermore, as the resin material for the endless belt, a polyamide-imide resin can be used instead of the polyimide resin. However, in terms of heat resistance, modulus of elasticity, strength, and the like, a polyimide resin is preferable.

The base member 1 is produced by applying an organic solvent solution of a polyimide precursor (polyamic acid), (i.e., polyimide varnish), into which an appropriate amount of a filler for improving thermal conductivity is compounded, onto the outer circumferential surface of a cylindrical core composed of metal by a dispenser method, followed by heating to about 350° C. to 450° C. to convert the precursor into a polyimide by dehydration and ring-closing. Examples of the polyimide varnish include U Varnish S of Ube Industries, Ltd., and examples of the organic solvent include N-methyl-2-pyrrolidone and dimethylacetamide, although not limited thereto.

The thickness of such an endless belt composed of the polyimide resin is preferably about 30 to 80 μm in view of durability and elasticity.

As the material for the elastic layer 3, as described above, silicone rubber or fluororubber having excellent heat resistance is preferable. In particular, an elastic layer having a two-layer structure in which a silicone rubber layer is arranged on the base member 1 side, and a fluororubber layer with a thickness of 20 to 100 μm is disposed thereon on the surface layer side is preferable in view of heat resistance and adhesion to the surface layer. That is, since the fluororubber layer is present on the surface layer 5 side, excellent adhesion to the surface layer 5 having a matrix made of fluororesin is exhibited. Furthermore, since fluororubber has good heat resistance, the silicone rubber layer is prevented from being damaged by heat during the formation of the surface layer. Furthermore, since the silicone rubber layer is present on the base member 1 side, the two-layer structure is also preferable in view of elasticity.

In order to improve the fixing property, the elastic layer 3 is required to excel in elasticity in the thickness direction. Accordingly, the hardness (JIS-A hardness) measured by the spring type hardness test, type A, according to JIS K6301 of the elastic layer 3 is preferably 10 to 60, and particularly preferably 10 to 40. Furthermore, the thickness of the elastic layer 3 is preferably 0.1 to 0.5 mm, and more preferably 0.2 mm or more.

In the conventional technique, it has been difficult to satisfy both a proper degree of elasticity and high thermal conductivity. The method of the present invention can satisfy both of them, and as a result, it is possible to obtain a fixing property capable of sufficiently responding to higher speed color printing.

The CNT used in the present invention can be produced by an arc discharge method, a laser ablation method, a plasma synthesis method, an electrolytic method, an electron beam irradiation method, a vapor deposition method, or the like. In particular, CNTs produced by the arc discharge method, the laser ablation method, and the vapor deposition method make it easy to control the configuration, such as diameter and length, and therefore, these methods are preferable as the method of producing CNTs used in the present invention. Above all, the vapor deposition method is particularly preferable because the control is particularly easy.

Examples of CNTs produced by the vapor deposition method include CNTs manufactured by Hyperion Catalysis International, Inc., Showa Denko K. K., Nikkiso Co., Ltd., Carbon Nanotech Institute, GSI Creos Corporation, and the like. Examples of the specific commercial product include VGCF-H manufactured by Showa Denko K. K.

The short axis diameter of the CNT is, although not particularly limited, preferably 0.5 μm or less, more preferably 0.3 μm or less, and particularly preferably 0.2 μm or less. As the short axis diameter decreases, the number of fibers increases for the same weight added, and an excellent effect of improving thermal conduction is exhibited, thus being preferable. Furthermore, there are a wide variety of types of CNTs including single-wall to multi-wall (double-wall) CNTs. The long axis diameter of the CNT is, although not particularly limited, preferably 50 μm or less, more preferably 40 μm or less, and particularly preferably 30 μm or less. When the short axis diameter and the long axis diameter are out of the ranges described above, it tends to become difficult to balance between thermal conductivity and mechanical strength.

Examples of the fluororesin used as the material for the surface layer 5 disposed on the outer circumferential side of the elastic layer 3 include a polytetrafluoroethylene resin (PTFE), a tetrafluoroethylene-perfluoroalkoxyethylene copolymer (PFA), a tetrafluoroethylene-hexafluoropropylene copolymer, and the like. In particular, in view of heat resistance, PTFE or PFA is preferably used.

The thickness of the surface layer 5 composed of a fluororesin is preferably 10 to 50 μm, more preferably 10 to 35 μm, and still more preferably 10 to 25 μm. When the thickness of the fluororesin layer is too small, durability is poor, and there is a possibility that the layer will be worn away early as the number of copies increases, resulting in degradation in releasability. When the thickness of the fluororesin layer is too large, the surface of the fixing belt hardens and the color toner fixing property is degraded.

The material for the primer layers 2 and 4 is not particularly limited. In view of adhesion, a rubber-based primer is preferable for the primer layer 2, and a fluoro-primer is preferable for the primer layer 4.

EXAMPLES

Examples 1 to 8, Reference Examples 1 to 3, and Comparative Examples 1 to 5

A fixing belt (i.e., a fixing sleeve including a base member 1, a primer layer 2, an elastic layer 3, a primer layer 4, and a surface layer 5) shown in FIG. 1 was produced using the procedure described below.

[Production of Base Member 1]

An organic solvent solution of a polyimide precursor (polyimide varnish, manufactured by Ube Industries, Ltd., trade name: U Varnish S) into which an appropriate amount of a filler for improving thermal conductivity was compounded was applied onto the outer circumferential surface of a cylindrical core composed of metal by a dispenser method. Heating was performed to about 350° C. to 450° C. to convert the precursor into a polyimide by dehydration and ring-closing. Then, the resulting product was detached from the cylindrical core to obtain a tubular base member 1. In addition, the base member 1 had a size of 50 μm in thickness, 26 mm in inside diameter, and 24 cm in length.

[Primer Layer 2]

X-33-174A/B (rubber-based primer) manufactured by Shin-Etsu Chemical Co., Ltd. was applied onto the base member 1 to form a primer layer 2. The thickness of the primer layer 2 after drying was about 10 μm.

[Production of Elastic Layer 3]

The filler and CNT shown in any of Tables I to IV in the amounts shown in any of Tables I to IV were mixed into known silicone rubber having a methyl side chain using a triple roll mill for each example. The resulting mixture was applied onto the outer circumferential surface of the primer layer 2 using a dispenser, and then shaping was performed by heat curing. Thereby, an elastic layer 3 with a thickness of 275 μm was obtained. Furthermore, the fillers and CNT used for the production of the elastic layer 3 are shown below.

(Filler)

1. SiC: SiC with a mean particle diameter of 1 μm was used. In the tables below, shown as "SiC".
2. Metal silicon: M-Si #600 (trade name) manufactured by Kinsei Matec Co., Ltd.; crushed form; mean particle diameter: about 6.0 μm. In the tables below, shown as "metal Si".
3. Alumina: Alumina CB-A10 (trade name) manufactured by Showa Denko K. K.; spherical shape; mean particle diameter: 10 mm. In the tables below, shown as "alumina".
4. Silica: FB-8S (trade name) manufactured by Denki Kagaku Kogyo K. K.; spherical shape; mean particle diameter: about 6.5 μm. In the tables below, shown as "silica".

(CNT)

Carbon nanotube VGCF-H (trade name) manufactured by Showa Denko K. K. was used. The CNT has a configuration in which the short axis diameter is 150 nm, and the long axis diameter is 6 μm.

The percent by volume X of the filler and the percent by volume Y of the CNT are calculated on the basis of the weight of each of silicone rubber, the filler, and the CNT used and the specific gravity of each of them. When two or more types of filler are used, the total percent by volume thereof is set to be X.

[Primer Layer 4]

Using 855N-703 (fluoro-primer) manufactured by DuPont, a primer layer 4 was formed on the elastic layer 3.

[Production of Surface Layer 5]

A fluororesin coating (PFA: 855N-713 manufactured by DuPont) was applied onto the primer layer 4, followed by treatment at about 340° C. to form a surface layer 5 (fluororesin layer). Thereby, a fixing belt shown in FIG. 1 was obtained. The thickness of the fluororesin layer was 15 μm.

Regarding the fixing belts produced as described above, the fixing property, hardness, thermal conductivity, and adhesion among the base member 1/primer layer 2/elastic layer 3 were measured by the methods described below, and a durability test was carried out. The results thereof are shown in Tables I to IV.

[Evaluation of Fixing Property]

Using the fixing belts produced, a color image was actually printed and evaluated. The surface temperature was set to 150° C. and the pressing force was set to 6 kg during printing. Furthermore, paper passing conditions during printing were such that 10 sheets of A4 size printing paper were continuously printed at 25 sheets/min, and the presence or absence of color unevenness and the presence or absence of roughness were determined visually. The results thereof are shown in Tables I to IV on the basis of the following criteria:

⊙: Neither color unevenness nor roughness was observed.

○: Color unevenness was not observed, but roughness was observed.

×: Color unevenness and roughness were both observed.

[Evaluation of Hardness and Thermal Conductivity]

Hardness was measured with a JIS-A hardness tester according to JIS K 6253. Thermal conductivity is the value obtained by multiplying the thermal diffusivity obtained by measurement with a periodic heating method measuring instrument FTC-1 manufactured by ULVAC-RIKO, Inc. by the specific heat measured according to JIS K 7123 and the density measured according to the method of JIS K 7112A.

[Evaluation of adhesion]

Evaluation was performed by measuring 180° peeling strength. Specifically, base rubber (silicone rubber) was formed at a predetermined thickness on a polyimide base member. A sample in which the base rubber was bonded to the polyimide base member by an adhesive was cut to a width of 1 cm, and the polyimide base member side was pulled by a tensile tester to measure the 180° peeling strength at the interface between the polyimide base member and the base rubber.

[Durability Test]

Using the fixing belts produced, a color image was actually printed. The surface temperature was set to 150° C. and the pressing force was set to 6 kg during printing. Furthermore, paper passing conditions during printing were such that sheets of A4 size printing paper were continuously printed at 25 sheets/min for 70 hours. The presence or absence of peeling among the base member 1/primer layer 2/elastic layer 3 of the fixing belt was visually observed, and evaluation was performed on the basis of the evaluation criteria described below.

[Evaluation Criteria]

⊙: No peeling occurs.

○: Peeling hardly occurs.

Δ: Peeling occurs in some cases, but at a practically allowable level.

×: Peeling occurs in large numbers and not at a practical level.

TABLE I

| | | Example 1 | Example 2 | Reference Example 1 |
|---|---|---|---|---|
| Type of rubber of elastic layer | | Silicone | Silicone | Silicone |
| Filler | Type | SiC | SiC | Metal Si |
| | Vol. % X | 42 | 42 | 42 |
| CNT Vol. % Y | | 1.5 | 2 | 2 |
| Hardness index: 10X + 3Y | | 425 | 426 | 426 |
| Thermal conduction index: 3X + 30Y | | 171 | 186 | 186 |
| Fixing property | | ○ | ⊚ | ⊚ |
| Hardness (degree) | | 19 | 20 | 20 |
| Thermal conductivity (W/m · K) | | 1.8 | 2.0 | 1.8 |

TABLE I-continued

| | Example 1 | Example 2 | Reference Example 1 |
|---|---|---|---|
| Additive to elastic layer | None | None | None |
| Adhesion (g/cm) | 180 | 180 | 170 |
| Durability test | ○ | ○ | ○ |

TABLE II

| | | Example 3 | Example 4 | Example 5 | Reference Example 2 | Reference Example 3 |
|---|---|---|---|---|---|---|
| Type of rubber of elastic layer | | Silicone | Silicone | Silicone | Silicone | Silicone |
| Filler | Type | SiC | SiC | SiC | Alumina | Metal Si |
| | Vol. % X | 50 | 50 | 50 | 50 | 50 |
| CNT Vol. % Y | | 1 | 1.5 | 2 | 2 | 2 |
| Hardness index: 10X + 3Y | | 503 | 505 | 506 | 506 | 506 |
| Thermal conduction index: 3X + 30Y | | 180 | 195 | 210 | 210 | 210 |
| Fixing property | | ◎ | ○ | ◎ | ◎ | ◎ |
| Hardness (degree) | | 22 | 23 | 24 | 20 | 24 |
| Thermal conductivity (W/m · K) | | 2.0 | 2.0 | 2.1 | 2.0 | 2.0 |
| Additive to elastic layer | | None | None | None | None | None |
| Adhesion(g/cm) | | 170 | 160 | 160 | 100 | 150 |
| Durability test | | ○ | ○ | ○ | Δ | ○ |

TABLE III

| | | Example 6 | Example 7 | Example 8 |
|---|---|---|---|---|
| Type of rubber of elastic layer | | Silicone | Silicone | Silicone |
| Filler | Type | SiC | SiC | SiC |
| | Vol. % X | 60 | 60 | 60 |
| CNT Vol. % Y | | 1 | 1.5 | 2 |
| Hardness index: 10X + 3Y | | 603 | 605 | 606 |
| Thermal conduction index: 3X + 30Y | | 210 | 225 | 240 |
| Fixing property | | ○ | ○ | ○ |
| Hardness (degree) | | 27 | 28 | 29 |
| Thermal conductivity | | 2.2 | 2.3 | 2.5 |
| Additive to elastic layer | | None | None | None |
| Adhesion (g/cm) | | 150 | 140 | 130 |
| Durability test | | ○ | ○ | ○ |

TABLE IV

| | | Comparative Example 1 | Comparative Example 2 | Comparative Example 3 | Comparative Example 4 | Comparative Example 5 |
|---|---|---|---|---|---|---|
| Type of rubber of elastic layer | | Silicone | Silicone | Silicone | Silicone | Silicone |
| Filler | Type | Silica | Alumina | Alumina | Alumina | Alumina |
| | Vol. % X | 30 | 50 | 80 | 40 | 75 |
| CNT Vol. % Y | | 0 | 0 | 0 | 1 | 10 |
| Hardness index: 10X + 3Y | | 300 | 500 | 800 | 403 | 780 |
| Thermal conduction index: 3X + 30Y | | 90 | 150 | 240 | 150 | 525 |
| Fixing property | | X | X | X | X | X |
| Hardness (degree) | | 12 | 15 | 40 | 16 | 42 |
| Thermal conductivity (W/m · K) | | 0.5 | 1.1 | 2.0 | 1.2 | 7.0 |
| Adhesion(g/cm) | | 250 | 120 | 50 | 120 | 30 |
| Durability test | | Δ | Δ | X | Δ | X |

Tables I to IV show the evaluation results of the fixing property and the like together with the hardness index and the thermal conduction index calculated from the percentages by volume of the filler and CNT. As is evident from the results of Tables I to IV, in Comparative Example 1 into which the filler and CNT are not compounded and in Comparative Examples 2 and 4 in which the thermal conduction index is less than or equal to 170, an excellent fixing property is not obtained. The reason for this is believed to be that the thermal conductivity is too low. Furthermore, in Comparative Examples 3 and 5 in which the hardness index is greater than or equal to 750, an excellent property is also not obtained. The reason for this is believed to be that the elastic layer is too hard and melting and mixing of color toners are insufficient.

In contrast, in Examples 1 to 8 into which the CNT is compounded and in which the hardness index and the thermal conduction index are within the ranges of the present invention, an excellent fixing property is obtained, and adhesion and the result of the durability test are excellent.

Furthermore, in Reference Example 2 in which alumina is used as the filler, an excellent fixing property is obtained. However, as is obvious from comparison between Example 5 and Reference Example 2 (the same conditions except for the type of filler), in the example of the present invention (Example 5) in which SiC is used as the filler, better thermal conductivity is exhibited, and in particular, adhesion and the result of the durability test are much better, indicating that by compounding SiC as the filler, adhesion among the base member 1/primer layer 2/elastic layer 3 is improved, and a fixing belt having excellent durability can be obtained.

In Reference Examples 1 and 3 in which metal silicon is used as the filler, an excellent fixing property is obtained, and adhesion and the results of the durability test are better than those of the case where alumina is used as the filler (Reference Example 2). However, as is obvious from comparison between Example 2 and Reference Example 1 (the same conditions except for the type of filler) and between Example 5 and Reference Example 3 (the same conditions except for the type of filler), the examples of the present invention (Examples 2 and 5) in which SiC is used as the filler excel in thermal conductivity and adhesion compared with the case where metal silicon is used. Examples 9 to 11 and Reference Examples 4 and 5

A fixing belt shown in FIG. 1 was produced as in Example 5 except that, in the production of the elastic layer 3, KBE-403 (3-glycidoxypropyltrimethoxysilane, silane coupling agent manufactured by Shin-Etsu Chemical Co., Ltd.) in the amount shown in Table V was added to silicone rubber. Regarding the fixing belt, the physical properties described above were measured. The results thereof are shown in Table V. Note that, in the table, the amount of KBE-403 added is indicated in terms of parts by weight relative to 100 parts by weight of silicone rubber.

TABLE V

| | | Example 9 | Example 10 | Example 11 | Reference Example 4 | Reference Example 5 |
|---|---|---|---|---|---|---|
| Type of rubber of elastic layer | | Silicone | Silicone | Silicone | Silicone | Silicone |
| Filler | Type | SiC | SiC | SiC | Alumina | Metal Si |
| | Vol. % X | 50 | 50 | 50 | 50 | 50 |
| CNT Vol. % Y | | 2 | 2 | 2 | 2 | 2 |
| Hardness index: 10X + 3Y | | 506 | 506 | 506 | 506 | 506 |
| Thermal conduction index: 3X + 30Y | | 210 | 210 | 210 | 210 | 210 |
| Fixing property | | ◎ | ◎ | ◎ | ◎ | ◎ |
| Hardness (degree) | | 24 | 24 | 24 | 20 | 24 |
| Thermal conductivity (W/m · K) | | 2.1 | 2.1 | 2.1 | 2.0 | 2.0 |
| Additive to elastic layer | Type | KBE-403 | KBE-403 | KBE-403 | KBE-403 | KBE-403 |
| | Amount of addition | 1 | 3 | 5 | 3 | 3 |
| Adhesion | | 180 | 180 | 170 | 120 | 180 |
| Durability test | | ◎ | ◎ | ◎ | ○ | ◎ |

In Examples 9 to 11, the elastic layer 3 is formed using silicone rubber, and a silane coupling agent is further added thereto (corresponding to Claim 6). As is obvious from the results of Table V, in the examples of the present invention, an excellent fixing property is obtained and adhesion among the base member 1/primer layer 2/elastic layer 3 and the result of the durability test are excellent. Moreover, adhesion and the result of the durability test are better than those of Example 5 in which the same conditions are used except that the silane coupling agent is not added. Consequently, the results of Table V show that by forming the elastic layer 3 using silicone rubber and by further adding a silane coupling agent thereto, adhesion among the base member 1/primer layer 2/elastic layer 3 is improved.

Furthermore, in Reference Example 4, in which alumina is used as the filler and the other conditions are the same as those of Example 10, an excellent fixing property is obtained. However, as is obvious form comparison between Example 10 and Reference Example 4, in the example of the present invention (Example 10) in which SiC is used as the filler, thermal conductivity is better, and adhesion and the durability test are largely improved, indicating that by compounding SiC as the filler, adhesion among the base member 1/primer layer 2/elastic layer 3 is improved, and a fixing belt having excellent durability can be obtained.

In Reference Example 5 in which metal silicon is used as the filler and the other conditions are the same as those of Example 10, the fixing property, adhesion, and the result of the durability test are similarly excellent. However, as is obvious from comparison between Example 10 and Reference Example 5, in the example of the present invention (Example 10) in which SiC is used as the filler, thermal conductivity excels compared with the case where metal silicon is used.

Examples 12 to 14

A fixing belt shown in FIG. 1 was produced as in Example 5 except that, in the production of the elastic layer 3, X-33-174A/B (rubber-based primer; hereinafter, may be abbreviated as X-33-174) manufactured by Shin-Etsu Chemical Co., Ltd. in the amount shown in Table VI was added to silicone rubber. Regarding the fixing belt, the physical properties described above were measured. The results thereof are shown in Table VI. Note that, in the table, the amount of X-33-174 added is indicated in terms of parts by weight relative to 100 parts by weight of silicone rubber.

TABLE VI

| | | Example 12 | Example 13 | Example 14 | Reference Example 6 | Reference Example 7 |
|---|---|---|---|---|---|---|
| Type of rubber of elastic layer | | Silicone | Silicone | Silicone | Silicone | Silicone |
| Filler | Type | SiC | SiC | SiC | Alumina | Metal Si |
| | Vol. % X | 50 | 50 | 50 | 50 | 50 |
| CNT Vol. % Y | | 2 | 2 | 2 | 2 | 2 |
| Hardness index: 10X + 3Y | | 506 | 506 | 506 | 506 | 506 |
| Thermal conduction index: 3X + 30Y | | 210 | 210 | 210 | 210 | 210 |
| Fixing property | | ◎ | ◎ | ◎ | ◎ | ◎ |
| Hardness (degree) | | 24 | 24 | 24 | 20 | 24 |
| Thermal conductivity (W/m · K) | | 2.1 | 2.1 | 2.1 | 2.0 | 2.0 |
| Additive to elastic layer | Type | X-33-174 | X-33-174 | X-33-174 | X-33-174 | X-33-174 |
| | Amount of addition | 0.5 | 1 | 3 | 1 | 1 |
| Adhesion(g/cm) | | 170 | 180 | 180 | 120 | 180 |
| Durability test | | ◎ | ◎ | ◎ | ○ | ◎ |

In Examples 12 to 14, the elastic layer 3 is formed using silicone rubber, and a rubber-based resin for primer use is further added thereto (corresponding to Claim 7). As is obvious from the results of Table VI, in Examples 12 to 14 in which the hardness index and the thermal conduction index are within the ranges of the present invention, an excellent fixing property is obtained. Moreover, adhesion among the base member 1/primer layer 2/elastic layer 3 and the result of the durability test are better than those of Example 5 in which the same conditions are used except that the rubber-based resin for primer use is not added. Consequently, the results of Table VI show that by forming the elastic layer 3 using silicone rubber and by further adding a rubber-based resin for primer use thereto, adhesion among the base member 1/primer layer 2/elastic layer 3 is improved.

Furthermore, in Reference Example 6 in which alumina is used as the filler and the other conditions are the same as those of Example 13, an excellent fixing property is obtained. However, as is obvious form comparison between Example 13 and Reference Example 6, in the example of the present invention (Example 13) in which SiC is used as the filler, thermal conductivity is better, and in particular, adhesion and the durability test are largely improved, indicating that by compounding SiC as the filler, adhesion among the base member 1/primer layer 2/elastic layer 3 is improved, and a fixing belt having excellent durability can be obtained.

In Reference Example 7 in which metal silicon is used as the filler and the other conditions are the same as those of Example 13, the fixing property, adhesion, and the result of the durability test are similarly excellent. However, as is obvious from comparison between Example 13 and Reference Example 7, in the example of the present invention (Example 13) in which SiC is used as the filler, thermal conductivity excels compared with the case where metal silicon is used.

Examples 15 to 17

A fixing belt shown in FIG. 1 was produced as in Example 5 except that silicone rubber (known silicone rubber having a methyl-type side chain) which is the same as the silicone rubber used for the elastic layer 3 was added to the primer layer 2 in the amount shown in Table VII. Regarding the fixing belt, the physical properties described above were measured. The results thereof are shown in Table VII. Note that, in the table, the amount of silicone rubber added is indicated in terms of parts by weight relative to 100 parts by weight of X-33-174A/B (rubber-based primer) constituting the primer layer 2.

TABLE VII

| | | Example 15 | Example 16 | Example 17 | Reference Example 8 | Reference Example 9 |
|---|---|---|---|---|---|---|
| Type of rubber of elastic layer | | Silicone | Silicone | Silicone | Silicone | Silicone |
| Filler | Type | SiC | SiC | SiC | Alumina | Metal Si |
| | Vol. % X | 50 | 50 | 50 | 50 | 50 |
| CNT Vol. % Y | | 2 | 2 | 2 | 2 | 2 |
| Hardness index: 10X + 3Y | | 506 | 506 | 506 | 506 | 506 |
| Thermal conduction index: 3X + 30Y | | 210 | 210 | 210 | 210 | 210 |
| Fixing property | | ◎ | ◎ | ◎ | ◎ | ◎ |
| Hardness (degree) | | 24 | 24 | 24 | 24 | 24 |
| Thermal conductivity (W/m · K) | | 2.1 | 2.1 | 2.1 | 2.0 | 2.0 |
| Additive to elastic layer | | None | None | None | None | None |
| Amount of silicone rubber added | | 1 | 5 | 10 | 5 | 5 |
| Adhesion(g/cm) | | 170 | 180 | 180 | 120 | 180 |
| Durability test | | ◎ | ◎ | ◎ | ○ | ◎ |

In Examples 15 to 17, silicone rubber is added to the primer layer 2 (corresponding to Claim 8). As is obvious from the results of Table VII, in Examples 15 to 17 in which the hardness index and the thermal conduction index are within the ranges of the present invention, an excellent fixing property is obtained. Moreover, adhesion among the base member 1/primer layer 2/elastic layer 3 and the result of the durability test are better than those of Example 5 in which the same conditions are used except that silicone rubber is not added to the primer layer 2. Consequently, the results of Table VII show that by adding silicone rubber to the primer layer 2, adhesion among the base member 1/primer layer 2/elastic layer 3 is improved.

Furthermore, in Reference Example 8 in which alumina is used as the filler and the other conditions are the same as those of Example 16, an excellent fixing property is obtained. However, as is obvious form comparison between Example 16 and Reference Example 8, in the example of the present invention (Example 16) in which SiC is used as the filler, thermal conductivity is better, and in particular, adhesion and the durability test are largely improved, indicating that by compounding SiC as the filler, adhesion among the base member 1/primer layer 2/elastic layer 3 is improved, and a fixing belt having excellent durability can be obtained.

In Reference Example 9 in which metal silicon is used as the filler and the other conditions are the same as those of Example 16, the fixing property, adhesion, and the result of the durability test are similarly excellent. However, as is obvious from comparison between Example 16 and Reference Example 9, in the example of the present invention (Example 16) in which SiC is used as the filler, thermal conductivity excels compared with the case where metal silicon is used.

| Reference Signs List |
|---|
| 1 base member |
| 2 lower primer layer |
| 3 elastic layer |
| 4 upper primer layer |
| 5 surface layer |

The invention claimed is:

1. A fixing belt comprising a tubular base member, an elastic layer disposed on the outer circumferential side of the base member, and a surface layer disposed on a surface on the outer circumferential side of the elastic layer, the fixing belt being characterized in that the elastic layer is composed of rubber into which a filler primarily composed of silicon carbide powder and a carbon nanotube are compounded; and the formulae $10X+3Y<750$, $3X+30Y>170$, $X>10$, and $Y>0.1$ are satisfied, where X is the percent by volume of the filler and Y is the percent by volume of the carbon nanotube in the elastic layer.

2. The fixing belt according to claim 1, characterized in that the rubber constituting the elastic layer is silicone rubber or fluororubber.

3. The fixing belt according to claim 1, characterized in that the surface layer is composed of a fluororesin.

4. The fixing belt according to claim 1, characterized in that the base member is a metal tube or heat-resistant plastic tube.

5. The fixing belt according to claim 4, characterized in that the base member is a tube composed of polyimide or polyamide-imide.

6. The fixing belt according to claim 1, characterized in that the base member and the elastic layer are bonded to each other with a lower primer layer; the rubber constituting the elastic layer is silicone rubber; and in the elastic layer, a silane coupling agent is compounded in an amount of 0.5% to 5% by weight relative to the silicone rubber.

7. The fixing belt according to claim 1, characterized in that the base member and the elastic layer are bonded to each other with a lower primer layer; the rubber constituting the elastic layer is silicone rubber; and in the elastic layer, a rubber-based resin for primer use is compounded in an amount of 0.1% to 3% by weight relative to the silicone rubber.

8. The fixing belt according to claim 1, characterized in that the base member and the elastic layer are bonded to each other with a lower primer layer; the rubber constituting the elastic layer is silicone rubber; and the lower primer layer contains silicone rubber.

* * * * *